US006681538B1

United States Patent
Sarkisian

(10) Patent No.: US 6,681,538 B1
(45) Date of Patent: Jan. 27, 2004

(54) SEISMIC STRUCTURAL DEVICE

(75) Inventor: Mark P. Sarkisian, San Anselmo, CA (US)

(73) Assignee: Skidmore, Owings & Merrill LLP, New York, NY (US)

( * ) Notice: Subject to any disclaimer, the term of this patent is extended or adjusted under 35 U.S.C. 154(b) by 1 day.

(21) Appl. No.: 10/200,679

(22) Filed: Jul. 22, 2002

(51) Int. Cl.$^7$ ................................................ E04B 7/00
(52) U.S. Cl. ........................... 52/289; 52/702; 52/167.1; 52/283; 403/335; 403/337
(58) Field of Search ................ 52/167.1, 283, 52/289, 702, 736.2; 403/335, 336, 337, 338, 257, 258, 83, 84, 87; 248/250

(56) References Cited

U.S. PATENT DOCUMENTS

| | | | |
|---|---|---|---|
| 3,938,294 A | 2/1976 | Gaburri | 52/743 |
| 3,974,614 A | 8/1976 | Strong | 52/573 |
| 4,041,659 A * | 8/1977 | McElhoe | 52/93.1 |
| 4,054,392 A * | 10/1977 | Oppenheim | 403/175 |
| 4,091,594 A | 5/1978 | Yamashita | 52/737.2 |
| 4,344,716 A * | 8/1982 | Sigal | 403/13 |
| 4,348,129 A * | 9/1982 | Conforti | 403/218 |
| 4,615,157 A * | 10/1986 | Murray | 52/167.4 |
| 4,658,556 A * | 4/1987 | Jenkins | 52/317 |
| 4,779,484 A * | 10/1988 | Poe | 74/608 |
| 4,781,003 A | 11/1988 | Rizza | 52/396 |
| 4,922,667 A | 5/1990 | Kobori et al. | 52/167 |
| 4,928,930 A * | 5/1990 | Chung | 256/67 |
| 5,319,907 A | 6/1994 | Nicholas et al. | 52/396.05 |
| 5,408,798 A | 4/1995 | Hohmann | 52/562 |
| 5,491,941 A | 2/1996 | Lancelot, III | 52/223.9 |
| 5,537,790 A | 7/1996 | Jackson | 52/393 |
| 5,797,227 A | 8/1998 | Garza-Tamez | 52/167.1 |
| 5,875,598 A | 3/1999 | Batten et al. | 52/396.01 |
| 6,101,780 A | 8/2000 | Kreidt | 52/712 |
| 6,102,627 A * | 8/2000 | Ueda et al. | 405/255 |
| 6,115,972 A | 9/2000 | Tamez | 52/167.4 |
| 6,185,897 B1 | 2/2001 | Johnson et al. | 52/583.1 |
| 6,237,292 B1 | 5/2001 | Hegemier et al. | 52/273 |
| 6,289,640 B1 | 9/2001 | Ueda et al. | 52/167.9 |
| 6,324,795 B1 | 12/2001 | Stiles et al. | 52/167.4 |
| 2001/0045069 A1 | 11/2001 | Constantinou | 52/167.3 |
| 2002/0184836 A1 * | 12/2002 | Takeuchi et al. | |

* cited by examiner

Primary Examiner—Carl D. Friedman
Assistant Examiner—Nahid Amiri
(74) Attorney, Agent, or Firm—Sonnenschein, Nath & Rosenthal LLP

(57) ABSTRACT

The present invention is a pin-fuse joint generally utilized in a beam-to-column joint assembly subject to extreme seismic loading. The pin-fuse joint resists bending moments and shears generated by these loads. The joint is comprised of standard structural steel building materials, but may be applied to structures comprised of structural steel, reinforced concrete, and or composite materials, e.g., a combination of structural steel and reinforced concrete. The beam-to-column assembly is comprised of a column and a beam and a plate assembly that extends between the column and the beam. The plate assembly is welded to the column and is attached to the beam via the pin-fuse joint. The pin fuse joint is created by a pin connection through the beam and the connection plates of the plate assembly at the web of the beam. Additionally, both the plate assembly and the beam have curved flange end connectors that sit flush against one another separated only by a brass shim when the beam and plate assembly are joined. The curved flange end connectors of the beam and plate assembly are then secured against one another by torqued high-strength bolts.

13 Claims, 7 Drawing Sheets

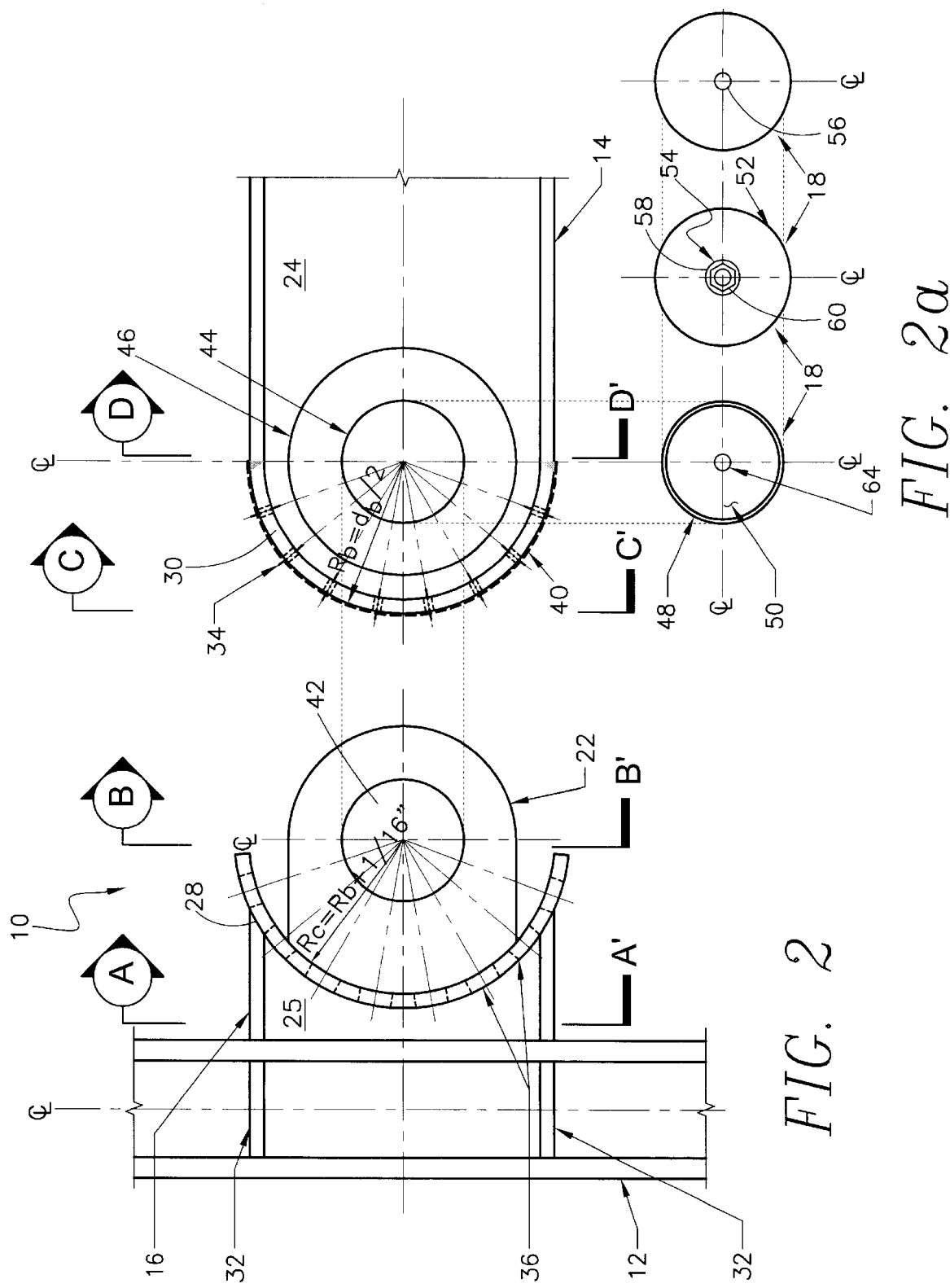

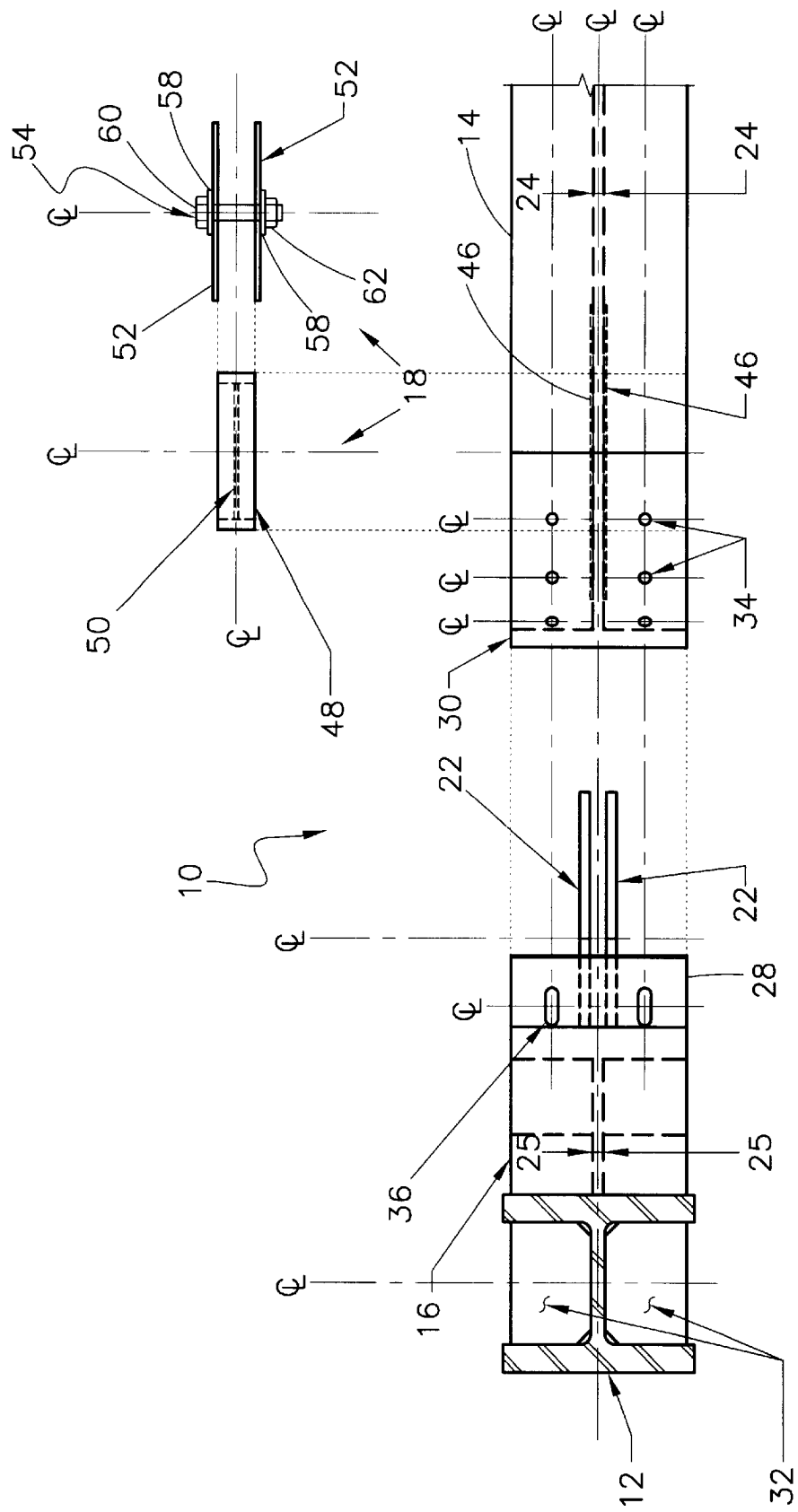

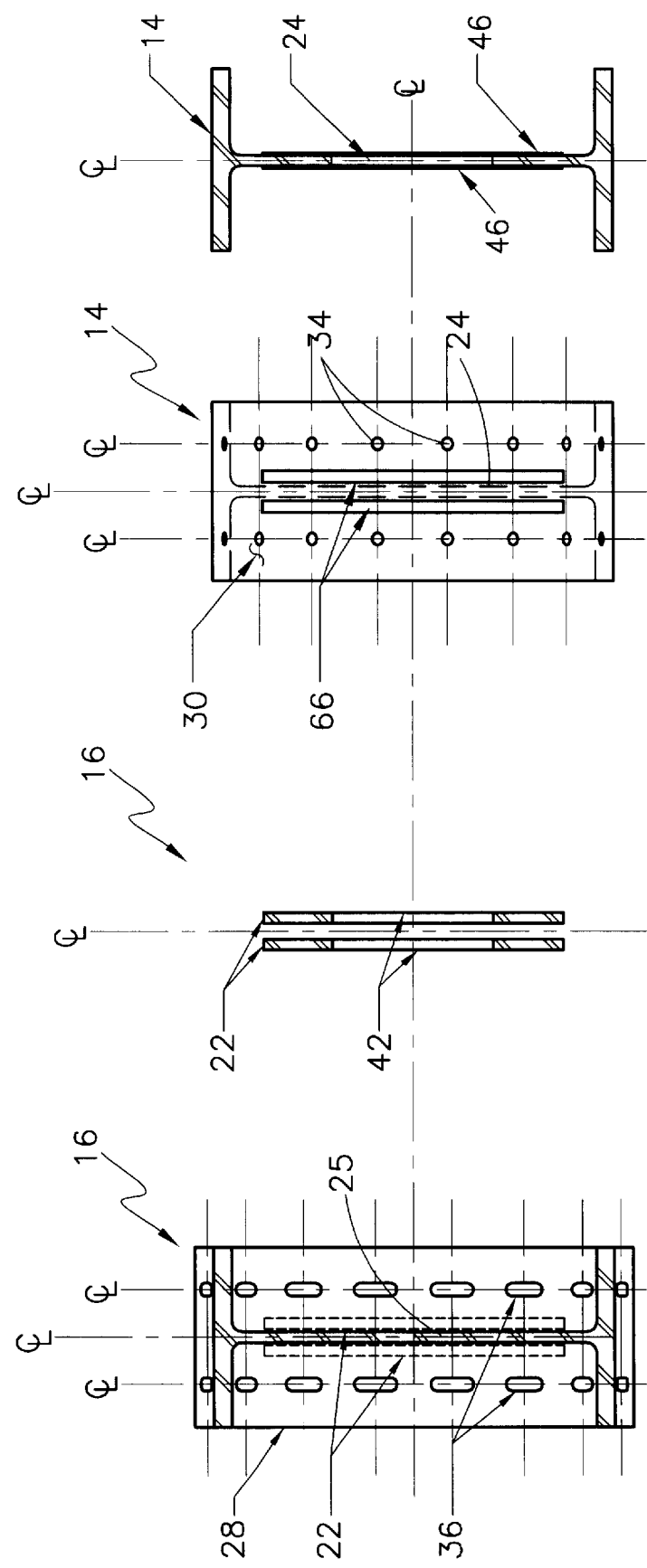

SEISMIC STRUCTURAL DEVICE

BACKGROUND OF THE INVENTION

1. Field of the Invention

The present invention generally relates to a beam-to-column joint to be utilized in the frame construction of buildings or other structures that are subject to seismic loads. In particular, the beam-to-column joint is a pin-fuse joint designed to lengthen dynamic periods and effectively reduce the forces that must be resisted within the frame so that the frame can withstand seismic activity without sustaining significant damage.

2. Description of the Related Art

Structures have been constructed, and are being constructed daily, in areas subject to extreme seismic activity. Special considerations must be given to the design of such structures. In additional to normal loading conditions, the frames of these structures must be designed not only to accommodate normal loading conditions, but also those loading conditions that are unique to seismic activity. For example, frame joints are typically subject to cyclic motions during seismic events. To withstand such loading conditions, structures subject to seismic activity must behave with ductility to allow for the dissipation of energy under these extreme loads.

In the past, most frame joints subject to seismic loads have been designed with the beam flanges connected directly to the column flanges via full penetration welds and with the beam webs either bolted or welded to columns. In recent seismic events, including the Northridge Earthquake in Northridge, Calif., moment-resisting frames of these types successfully prevented buildings from collapsing due to applied seismic loads. While these moment-resisting frames have proven successful in preventing buildings from collapsing, the frames have not done so without sustaining significant damage. After being subject to seismic loads, most of these types of moment-resisting frames have exhibited local failures of connections due to poor joint ductility. Such joint failures have raised significant concerns about the structural integrity and the economic performance of currently employed moment-resisting frames after being subject to an earthquake.

Since the Northridge Earthquake, extensive research of beam-to-column moment connections has been performed to improve the ductility of joints subject to seismic loading conditions. This research has lead to the development of several modified joint connections, one of which is the reduced beam section connection ("RBS") or "Dogbone." Another is a slotted web connection ("SSDA") developed by Seismic Structural Design Associates, Inc. While these modified joints have been successful in increasing the ductility of the structure, these modified joints must still behave inelastically to withstand extreme seismic loading. It is this inelasticity, however, that causes joint failure and in many cases cause the joint to sustain significant damage. Although the amount of dissipated energy is increased by increasing the ductility, because the joints still perform inelastically, the currently designed joints still tend to become plastic or yield when subjected to extreme seismic loading.

Although current joint designs may be able to withstand a seismic event, the damage caused by the joints' inability to function elastically, raises series questions about whether currently designed structures can remain in service after enduring seismic events. A need therefore exists for a moment resisting frame that can withstand a seismic event without experiencing significant joint failure so that the integrity of the structure remains relatively undisturbed even after being subject to seismic activity.

SUMMARY OF THE INVENTION

The present invention is a "pin-fuse" joint that is generally utilized in a beam-to-column joint assembly. The pin fuse joint is designed to be incorporated into the frame of a building or other structure subject to seismic activity and to improve a structure's dynamic characteristics by allowing the joint to slip under extreme loads. This slippage changes the structures dynamic characteristics by lengthening the structures fundamental period and essentially softening the structure, allowing the structure to exhibit elastic properties during seismic events. By utilizing the pin-fuse joint, it is generally not necessary to use frame members as large as typically used for a similar sized structure to withstand an extreme seismic event, thereby overall building costs can also be reduced through the use of the pin-fuse joint of the present invention.

The pin-fuse joint is generally employed near the end of a beam, where the beam attaches to the column. Rather than attaching directly to the column, a plate assembly is welded to the column and extends therefrom for attachment to the beam. It is the attachment of the plate assembly to the beam that creates the "pin-fuse" joint. To create the joint, the plate assembly and the end of the beam are designed to mate and be held together by a pipe/pin assembly extending through the web of the beam and through connection plates that extend outward from the plate assembly. Additionally, the end of the plate assembly has a curved flange end connector which abuts against an opposing curved flange end connector located at the end of the beam. The curved flange end connectors of the plate assembly and the beam are then secured together by torqued high-strength steel bolts. These bolted connections allow for the curved flange end connector of the beam to slip relative to the curved flange end connector or the plate assembly when subject to extreme seismic loads without a significant loss in clamping force. Movement in the joint is further restricted by treating the faying surfaces of the curved flange end connectors of the plate assembly and the beam with brass. The brass shims used within the connection possesses a well-defined load-displacement behavior and excellent cyclic attributes.

The friction developed from the clamping force from the bolted flange end connection and the brass shims against the steel surface of the curved flange end connectors prevent the joint from slipping under most service loading conditions, such as those imposed by wind, gravity, and moderate seismic events. High-strength bolts are torqued to provide a slip resistant connection by developing friction between the connected surfaces. However, under extreme seismic loading conditions, the level of force applied to the curved flange ends exceeds the product of the coefficient of friction times the normal bolt clamping force, which cause the joint to rotate while maintaining connectivity.

The rotation of the joint during seismic events provides for the transfer of shear forces and bending moment from the structural steel beams to the structural steel columns. This rotation dissipates energy, which is also known as "fusing." It is this energy dissipation that reduces potential damage to the structure due to seismic activity.

Although the joints of the present invention will slip under extreme seismic loads to dissipate the energy, the joints will, however, remain elastic due to their construction. Furthermore, no part of the joint becomes plastic or yields when subjected to the loading and the slip. This allows a moment-resisting frame utilizing the joint construction of the present invention to remain in services after enduring a seismic event and conceivably resist further seismic activity.

BRIEF DESCRIPTION OF THE DRAWINGS

A more complete appreciation of the invention and many of the advantages thereof will be readily obtained as the same becomes better understood by references to the detailed description when considered in connection with the accompanying drawings, wherein:

FIG. 2 is an exploded front view of the beam-to-column joint assembly illustrated in FIG. 1;

FIG. 2a is a front view of a pipe/pin assembly and web stiffener used to connect the moment-resisting beam to the plate assembly;

FIG. 3 is an exploded top view of the beam-to-column joint assembly illustrated in FIG. 1;

FIG. 3a is a side view of the pipe/pin assembly and web stiffener used to connect the beam to the plate assembly;

FIG. 4 is a cross sectional view of the plate assembly of FIG. 2 taken along line A–A', FIG. 5 is a cross sectional view of the plate assembly of FIG. 2 taken along line B–B';

FIG. 6 is a cross sectional view of the moment-resisting beam of FIG. 2 taken along line C–C';

FIG. 7 is a cross sectional view of the moment-resisting beam of FIG. 2 taken along line D–D';

DETAILED DESCRIPTION OF THE PREFERRED EMBODIMENT

Figure 1:
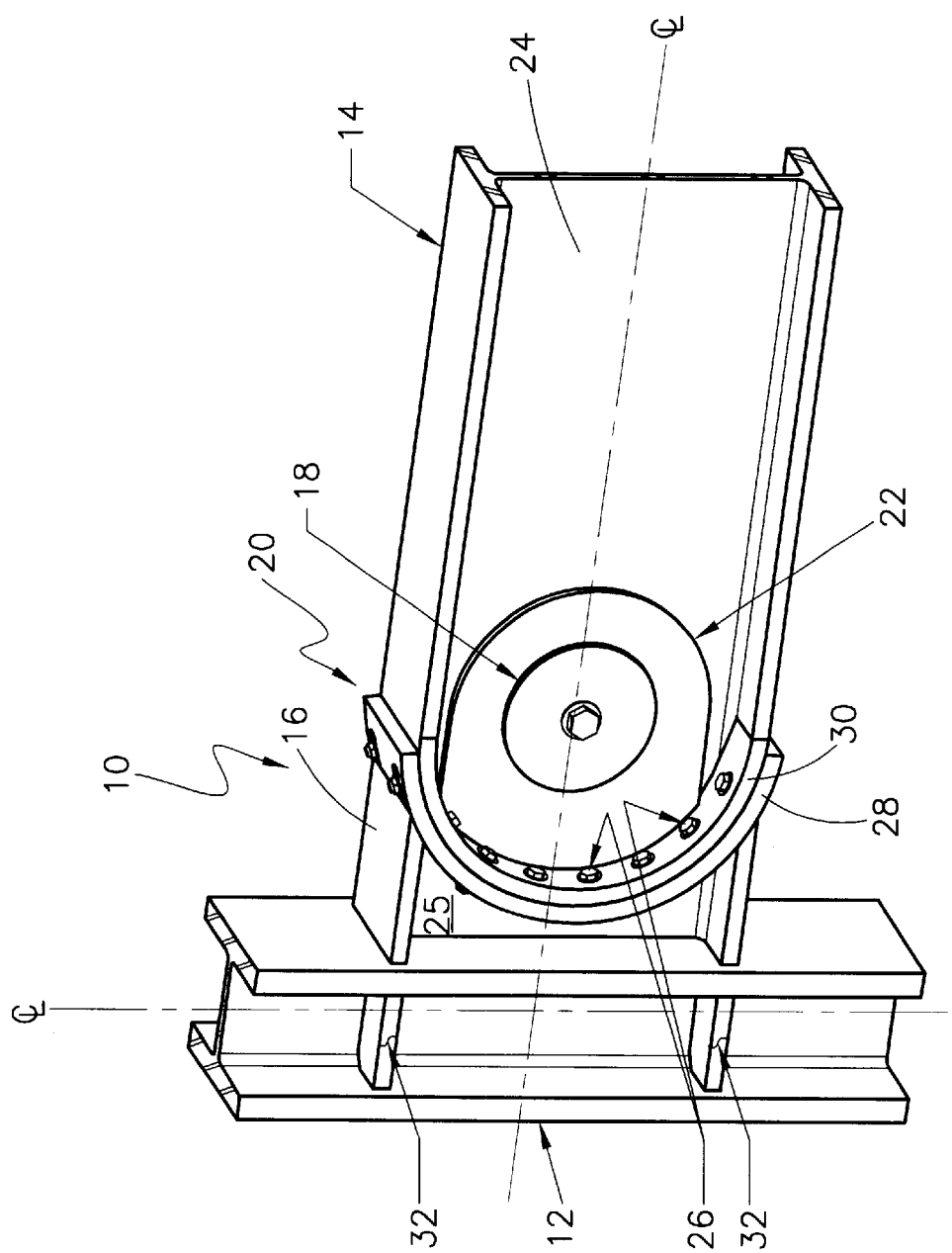
FIG. 1 is a perspective view of one embodiment of a beam-to-column joint assembly of the present invention.

FIG. 1 is a perspective view of one embodiment of the beam-to-column joint assembly 10 of the present invention. As seen in FIG. 1, the beam-to-column joint assembly 10 consists of a structural steel column 12 attached to a structural steel beam 14 via a steel plate assembly 16 that extends between the column 12 and the beam 14. The steel plate assembly 16 is welded directly to the column 12 and is attached to the beam 14 via a pin-fuse joint 20. To create the pin-fuse joint 20, the plate assembly 16 is connected to the beam 14 via a structural steel pipe or pin 18 that extends through the web 24 of the beam 14 and two twin connection plates 22 extending from the plate assembly 16. Additionally, the opposing ends of both the plate assembly 16 and the beam 14 have curved flange end connectors 28 and 30, respectively, that are designed to abut against with one another when the joint 20 is complete. High-strength bolts 26 then extend through the opposing curved flange end connectors 28 and 30 to further secure the plate assembly 16 and beam 14. As further described below, connecting the beam 14 and the plate assembly 16 together via the pipe/pin assembly 18 and flanged end connectors 28 and 30 creates the pin-fuse joint 20 of the present invention.

Although the perspective view shown in FIG. I is specific to one side of the column 12 connection, in many, if not most conditions, the connection of the moment resisting beam 14 to the column 12 via the pin-fuse joint 20 will exist on both sides of the column 12. Therefore, all of the conditions described in the specific embodiments included herein are appropriate for the beam 14 connection on both sides of the column 12 with the detailing symmetrically required on the opposite side of the steel column 12. Furthermore, although the present invention is described as applied to a structure consisting of structural steel, one skilled in the art may also utilize the joint 20 in structures consisting of reinforced concrete and/or composite materials, e.g., a combination of structural steel and reinforced concrete.

FIG. 2 is an exploded front view of the beam-to-column joint assembly 10 illustrated in FIG. 1. This view illustrates the plate assembly 16 and the beam 14 as they would appear when the joint 20 is disconnected. As previously discussed, the plate assembly 16 is welded to the column 12. Generally, column stiffeners 32 are required to be welded into the web of the column 12 to resist local buckling of the column 12. As seen in FIGS. 1 & 2, the end of the plate assembly 16 that is welded to the column 12 resembles that of a cross-beam, which in this illustration is an I-beam, and which matches the cross-section of the moment-resisting beam 14, which is also illustrated as an I-beam.

The end of the plate assembly 16 opposing the column 12 is designed to connect with the end of a moment-resisting beam 14. In this embodiment, a curved flange end connector 28, generally shaped like a half-circle, is welded to the end of the plate assembly 16 such that the convex or curved portion of the flange end connector 28 is positioned inward, toward the web 24 of the plate assembly 16. Similarly, welded to one end of the beam 14 is a corresponding curved flange end connector 30, which is positioned to curve outward and away from the web 24 of the beam 14. When positioned together, to connect the joint 20, the curved flange end connector 30 of the beam 14 rests flush against the curved flange end connector 28 of the plate assembly 16, as shown in FIG. 1. A brass shim 40 is placed between the curved flange connectors 28 and 30.

The flange end connectors 28 and 30 are secured together by high-strength bolts 26, as shown in FIG. 1. The flange end connector 28 of the plate assembly 16 has generally evenly space long-slotted holes 36 that align with generally evenly spaced standard holes 34 in the flange end connector 30 of the beam. Once aligned, the torqued high-strength bolts 26 are placed in the holes 34 and 36 to connect the beam 14 to the plate assembly 16.

Additionally, the plate assembly 16 has twin connecting plates 22 that are welded to the curved flange end connectors 28 of the plate assembly 16 and that extend directly outward and away from the plate assembly 16 in a direction parallel to the web 25 of the assembly 16. Each connection plate 22 has a circular hole 42 that corresponds in size and position to a circular hole 44 in the web 24 of the moment-resisting beam 14 when the plate assembly 16 and beam 14 are joined. As further explained below, and as shown in FIG. 2a, a pipe/pin assembly 18, having a web stiffener 50, is placed through the holes 42 and 44, to secure the plate assembly 16 and beam 14 via a pin connection. Steel shim spacers 46, having center holes that correspond in size to the holes 42 and 44 are positioned on each side of the web 24 of the beam 14 between the web 24 and the connection plates 22 to assist with the receipt and engagement of the pipe/pin assembly 18.

FIG. 2a is a front view of the pipe/pin assembly 18 with a web stiffener 50 used to create a pin connection between the beam 14 to the plate assembly 16. As shown in FIG. 2a, the pipe/pin assembly 18 consists of a structural steel pipe 48, two cap plates 52 and a high-strength bolt 54. The steel pipe 48, with a steel web stiffener 50, is inserted into the circular holes 42 and 44 in the web 24 of the beam and in the twin tongue connection plates 22. The structural steel pipe 48 is then laterally restrained in the beam web 24 by two steel keeper or cap plates 52, one plate 52 positioned on each side of the pipe 48. These keeper or cap plates 52 are fastened together with a torqued high-strength bolt 54. The bolt 54 is aligned through a standard hole 56 in both pipe cap plates 52 and through a hole 64 in the web stiffener 50. Steel washers 58 are used under the bolt head 60 and under the end nut 62 (as best shown in FIG. 3a), which is standard construction for all the torqued high-strength bolts utilized in the pin-fuse joint connection 20. Two steel spacers 46, one placed on each side of the web 24, are required for the connection between the beam web 24 and each twin connection plate 22.

FIG. 3 is an exploded top view of the beam-to-column joint assembly 10 illustrated in FIG. 1. This view best illustrates the placement of the twin connection plates 22. As shown in FIG. 3, the twin connection plates 22 extend directly outward from the flange end connector 28 of the plate assemble 16, parallel to the web 25 of the plate assembly 16. The connection plates 22 are placed equidistant from one another relative to the center line of the plate assembly.

As previously discussed, one connection plate 22 is positioned on each side of the web 24 of the beam 14 when the plate assembly 16 and the beam 14 are joined. Steel spacers 46 are also positioned between the web 24 of the beam 14 and each connection plate 22. Thus, the twin connection plates 22 must be welded to the flange end connector 28 of the plate assembly 16 at a distance from center to allow for the twin connection plates 22 to be positioned one each side of the web 24 of the beam, with enough room between the web 24 of the beam and connection plates 22 to receive a steel spacer 46 therebetween.

Also, illustrated in FIG. 3a, is a top view of the pipe/pin assembly 18 used to connect the beam 14 to the plate assembly 16. This view best illustrates how the steel pipe 48, with a steel web stiffener 50, is restrained by the cap plates 52, which are then fastened together with a torqued high-strength bolt 54. The bolt is aligned through a standard hole 64 in the web stiffener 50 and through the holes 56 in the opposing cap plates 52. Steel washers 58 are used under the bolt head 54 and under the end nut 60 to secured the cap plates 52 against the pipe 48.

FIG. 4 is a cross sectional view of the plate assembly 16 of FIG. 2 taken along line A–A'. The section illustrates the cross-section of the end portion of the plate assembly 16 nearest the column 12, which in this illustration is an I-beam. In addition, the curved flange end plate 28 is shown having the long slotted bolt holes 36 for the high-strength bolts 26. The holes 36 in the curved flange connectors 28 are long slotted holes 36, rather than standard size holes, as used in curved flange end connector 30 of the beam 14, to allow for the beam 14 to rotate or slip relative to the plate assembly 16 at the curved flange end connection of the plate assembly 16 and beam 14. FIG. 4 also shows the positioning of the connection plates 22 relative to the web 25 of the plate assembly 16.

FIG. 5 is a cross sectional view of the plate assembly 16 of FIG. 2 taken along line B–B', which is a cross-section taken through the connection plates 22. The circular holes 42 of the connection plates 22 are shown by this section.

FIG. 6 is a cross sectional view of the beam 14 of FIG. 2 taken along line C–C'. This view best illustrates the slots 66 in the curved flange end connector 30 of the beam for receiving the connection plates 22 of the plate assembly 16. These slots 66 are required in the curved flange end connector 30 to allow for connection of the pipe/pin assembly 18 through the web 24 of the beam 14 and the connection plates 22, which creates the pin connection of the pin-fuse joint. The standard sized holes 34 in the curved flange end connector 30 of beam 14 are also illustrated.

FIG. 7 is a cross sectional view of the beam 14 of FIG. 2 taken along line D–D'. This view shows the cross-section of the shim spacers 46 located on either side of the web 24 of the moment resisting beam 14 and the hole 44 in the web 24 for receiving the pipe 48 of the pipe/pin assembly 18.

Figure 8:
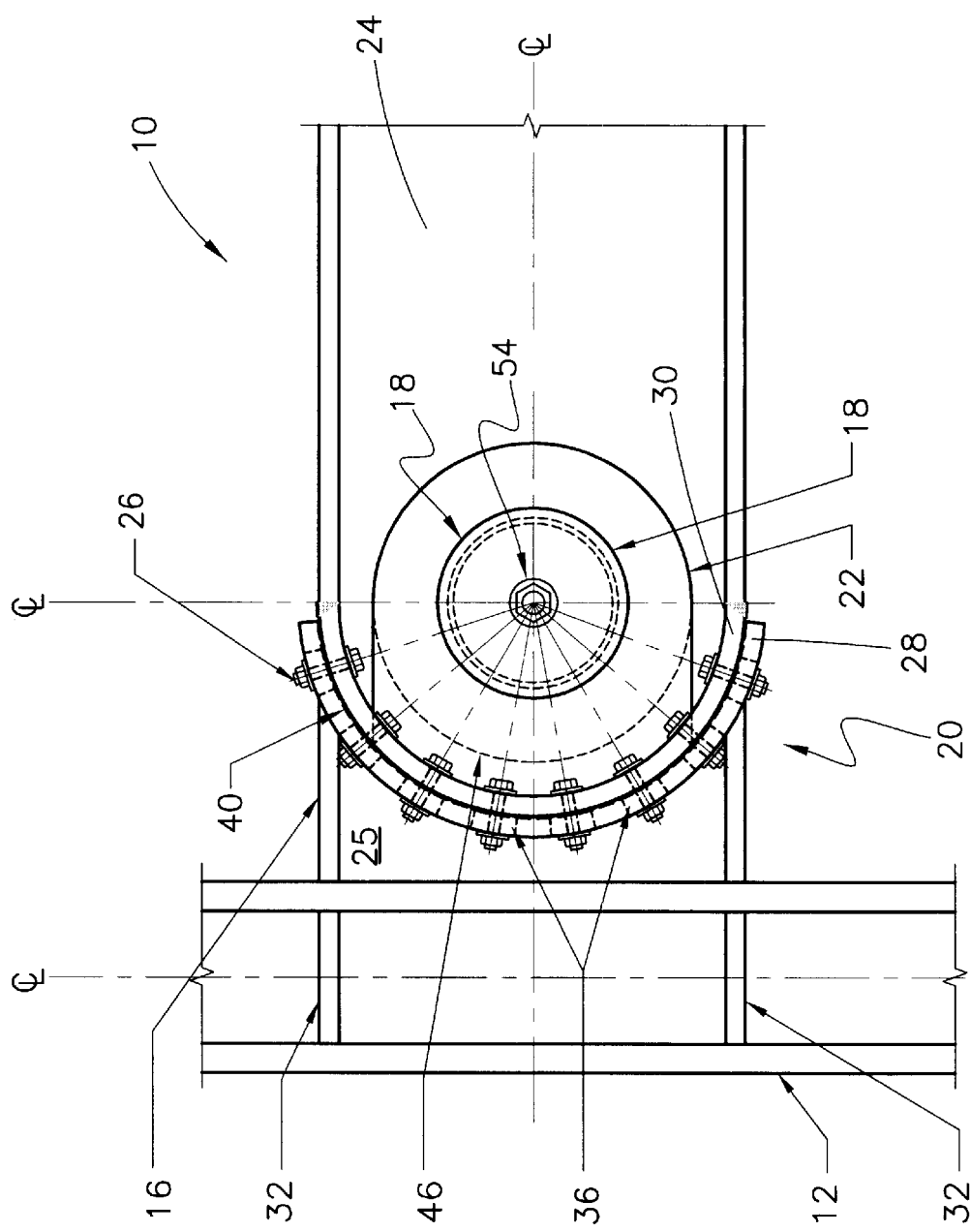
FIG. 8 is a front view of one embodiment of the beam-to-column joint assembly of the present invention.

FIG. 8 is a front view of one embodiment of the beam-to-column joint assembly 10 as it would appear with the beam 14 and plate assembly 16 connected via the pin-fuse joint 20. This view best illustrates the placement of the high-strength steel bolts 28 through the curved flange end connectors 28 and 30. Like the high-strength bolt 54 used in the connection with the pipe/pin assembly 18, the high-strength bolts 26 use steel washers 58 under the bolt head 60 and under the end nut 62 to secure the curved flange end connectors 28 and 30 together. As explained previously, the long slotted holes 36 in the curved flange end connector 28 of the plate assembly 16 allow the curved flange end connector 30 to slip or rotate relative to the curved flange end connector 28 of the plate assembly 16 when subject to extreme seismic loads. The rotation or slipping that occurs between the flange end connectors 28 and 30 transfers bending moment through the curved flange end connector 30 of the beam 14 to the column 12, thereby dissipating energy at the joint 20.

To control slippage or rotation between the flange end connectors 28 and 30, when subject to standard load conditions, such as wind, gravity and moderate seismic events, a brass shim 40 is placed between the flange end connectors 28 and 30. The coefficient of friction of the brass against the cleaned mill surface of structural steel is very well understood and accurately predicted. Thus, the amount of bending moment that the joint can bear before a slip or rotation will occur between the flange end connectors 28 and 30 is generally known. Furthermore, tests have proven that bolt tensioning in the high-strength bolts 26 is not lost during the slipping process. This, means that the frictional resistance of the joint is maintained after the structural frame/joint motion comes to rest following the rotation or slippage between the flange end connectors 28 and 30. Thus, the pin-fuse joint should continue not to slip during moderate loading conditions, even after undergoing extreme seismic activity.

Figure 9:
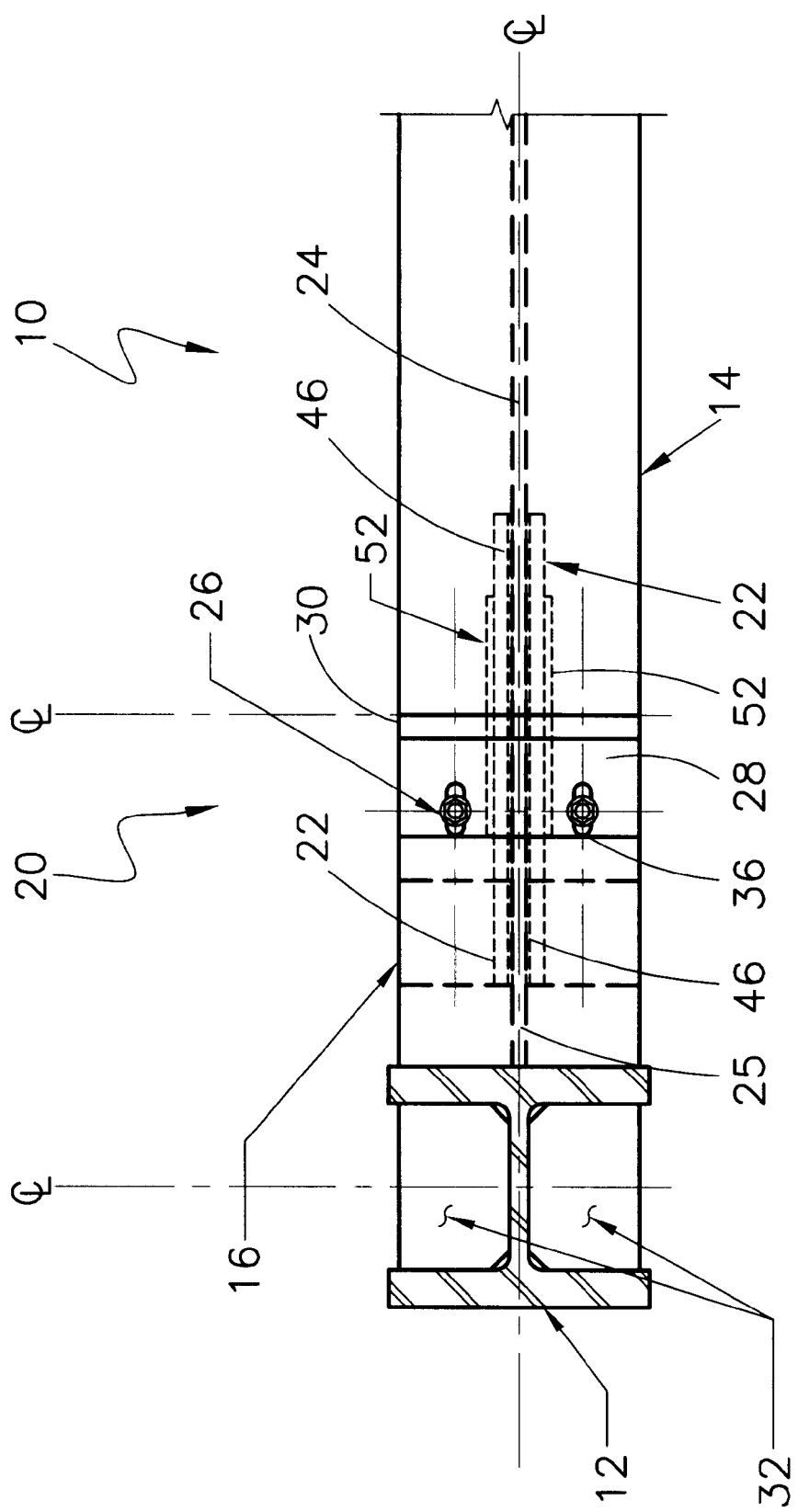
FIG. 9 is a top view of one embodiment of the beam-to-column joint assembly of the present invention.

FIG. 9 is a top view of one embodiment of the beam-to-column joint assembly 10. This view best illustrates the positioning of the plate connectors 22, the shim spacers 46 and the web 24 of the beam 14, relative to one another when the joint 20 is connected.

Figure 10:
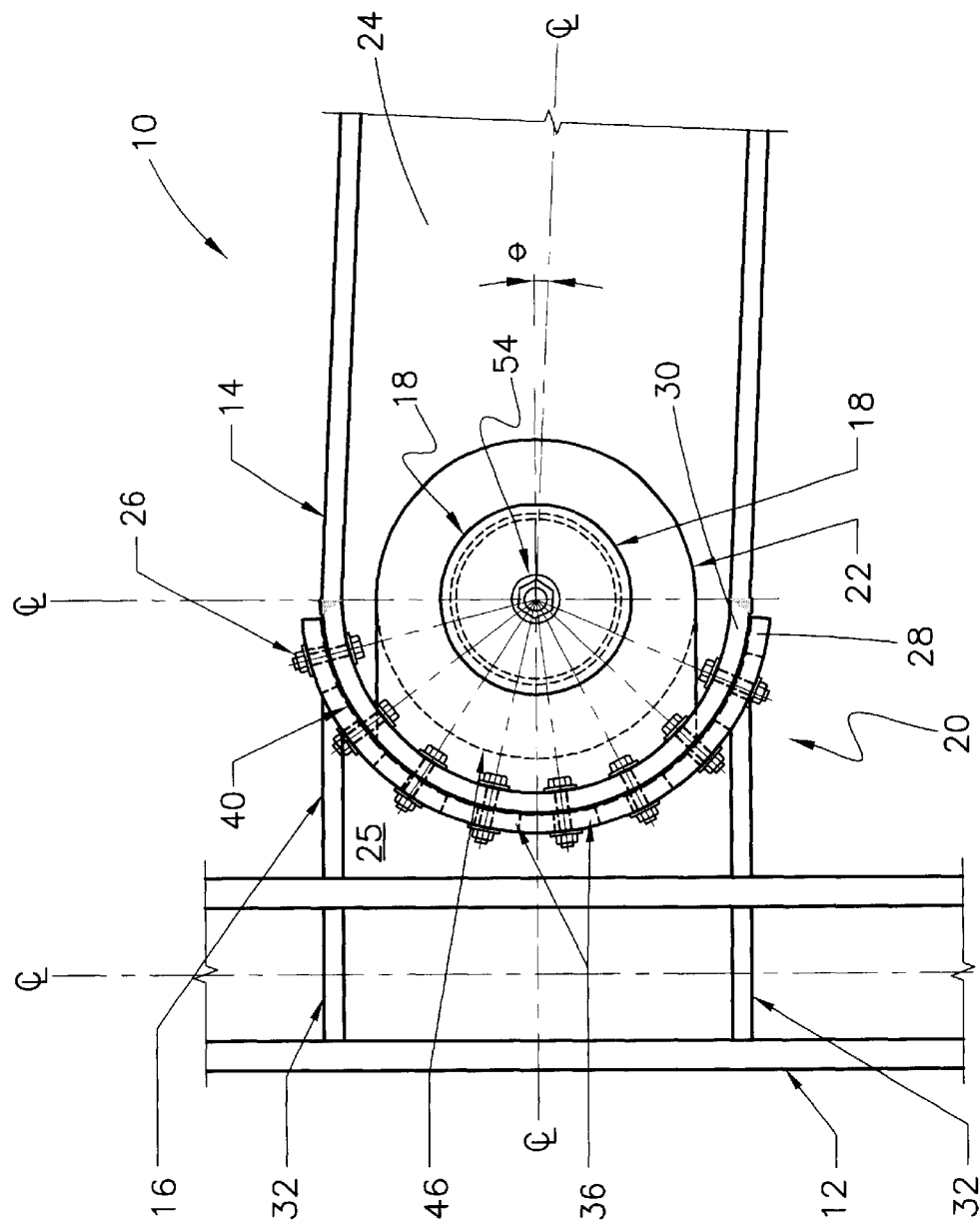
FIG. 10 is a perspective view of the beam-to-column joint assembly of the present invention as it would appear with the pin-fuse joint rotated when subject to extreme loading conditions.

FIG. 10 is a perspective view of the joint 20 of the present invention as it would appear rotated when placed under a seismic load. When subject to seismic loads, shear forces and bending moments are introduced into the structural frame from ground motions due to seismic activity. When the loads are extreme, the pin-fuse joint 20 will rotate or slip, as shown in FIG. 10. The joint 20 will rotate about the pin connection, which is created through the introduction of the pipe/pin assembly 18 into the web 24 of the beam 14 and the connection plates 22 of the plate assembly 16. Shear loads are transferred to the column 12 through this pin connection. Similarly, a slip or rotation occurs between the curved flange end connectors 28 and 30 of the plate assembly 16 and beam 14 respectively. Bending moment is transferred to the column 12 while slip between the curved flange end connectors 28 and 30 occurs.

Accordingly, with the slip or rotation of the pin-fuse joint, energy is dissipated. The dynamic characteristics of structure are thus changed during a seismic event once the onset of slip occurs. The period is lengthened through the inherent softening, i.e., stiffness reduction, of the structure, subsequently reducing the effective force and damage to the structure.

It will be understood that the above-described arrangements of apparatus and the method therefrom are merely illustrative of applications of the principles of this invention and many other embodiments and modifications may be made without departing from the spirit and scope of the invention as defined in the claims.

For example, other applications of the pin-fuse joint 10 within a building frame may include the introduction of the joint 10 into other structural support members in addition to the beam, such as the frame columns 12, primarily at the base of the column 12. Other materials may be considered for the building frame and joint 10, including, but are not limited to, composite resin materials such as fiberglass. Alternate structural steel shapes may also be used in the pin-fuse joints 10, including, but not limited to, built-up sections, i.e., welded plates, or other rolled shaped such as channels. Alternative materials (other than brass) may also be used between the curved flange end connectors 28 and 30 to achieve a predictable slip threshold. Such materials may include, but not be limited to, teflon, bronze or steel with a controlled mill finish. Steel, teflon, bronze or other materials may also be used in place of the brass shims 40 in the flange end connection.

What is claimed is:

1. A joint connection comprising:
   a plate assembly;
   a support member;
   a pin connection assembly;
   the support member having a flange end connector and a hole for receiving the pin connection assembly;
   the plate assembly having at least one connection plate having a hole for aligning with the hole in the support member and for receiving the pin connection assembly; and
   the plate assembly having a curved flange end connector that abuts against the flange end connection of the support member and is secured against the flange end connector of the support member, the curvature of the curved flange end connector of the plate assembly generally matches the curvature of the flange end connector of the support member.

2. The joint connection of claim 1 where the support member is a beam.

3. The joint connection of claim 1 where the support member is a column.

4. The joint connection of claim 1 further comprising a shim positioned between the flange end connector of the plate assembly and the flange end connector of the support member.

5. The joint connection of claim 4 where the shim is made of brass.

6. The joint connection of claim 4 where the shim is made of steel.

7. The joint connection of claim 4 where the shim is made of teflon.

8. The joint of claim 4 where the shim is made of bronze.

9. The joint connection of claim 1 where the plate assembly and support member are made of structural steel.

10. The joint connection of claim 1 where the plate assembly and support member are made of composite material.

11. The joint connection of claim 1 where the pin assembly comprises a cut structural steel pipe, caps plates positioned on each side of the structural steel pipe and a high-strength steel bolt that extends through the structural steel pipe and the cap plates.

12. The joint connection of claim 11 where the steel pipe includes a web stiffener having a hole for receiving the high-strength steel bolt.

13. The joint connection of claim 1 where the curved flange end connector is secured against the curved flange end connector of the support member via at least one high-strength bolt.

* * * * *